United States Patent [19]

Morishita et al.

[11] Patent Number: 5,597,355
[45] Date of Patent: Jan. 28, 1997

[54] TORSIONAL DAMPER WITH GUIDED FRICTION BLOCKS

[75] Inventors: Tatsuya Morishita, Atsugi; Takashi Murasugi, Ebina, both of Japan

[73] Assignees: Unisia Jecs Corporation, Atsugi; Nissan Motor Co., Ltd., Yokohama, both of Japan

[21] Appl. No.: 328,911

[22] Filed: Oct. 25, 1994

[30] Foreign Application Priority Data

Nov. 18, 1993 [JP] Japan .............. 5-061978 U

[51] Int. Cl.⁶ .............. F16F 15/12; F16D 3/12
[52] U.S. Cl. .............. 464/68; 192/214.1
[58] Field of Search .............. 464/66, 68, 67, 464/64; 192/106.2, 205, 209, 214; 74/574

[56] References Cited

U.S. PATENT DOCUMENTS

| | | | |
|---|---|---|---|
| 4,635,780 | 1/1987 | Wiggen | 464/68 X |
| 4,741,423 | 5/1988 | Hayen | 464/64 |
| 4,782,933 | 11/1988 | Jäckel et al. | 192/70.18 |
| 4,904,225 | 2/1990 | Worner et al. | 464/67 |
| 5,014,842 | 5/1991 | Graton et al. | 464/68 X |
| 5,139,124 | 8/1992 | Friedmann | 192/48.3 |
| 5,245,889 | 9/1993 | Kohno et al. | 74/573 |
| 5,249,660 | 10/1993 | Feldhaus et al. | 464/68 X |
| 5,370,581 | 12/1994 | Rohrle et al. | 464/68 |
| 5,380,248 | 1/1995 | Kraus et al. | 464/66 |

FOREIGN PATENT DOCUMENTS 2231937  11/1990  United Kingdom .............. 464/64

*Primary Examiner*—Daniel P. Stodola
*Assistant Examiner*—Eileen A. Dunn
*Attorney, Agent, or Firm*—Foley & Lardner

[57] ABSTRACT

A torsional damper comprises first and second damper elements resiliently coupled by a spring arrangement, and a friction generating device. The friction generating device includes a plurality of friction blocks received in a plurality of windows, respectively, of the second damper element with play in the circumferential direction of the second damper element. The plurality of friction blocks are biased against a radially extending wall of the first damper element by a spring(s). For avoiding undesired interference engagement with the second damper element, the friction generating device includes a pair of axially opposed guide grooves for restricting radial mobility, with respect to an axis of rotation of the torsional damper, of the plurality of friction blocks.

8 Claims, 4 Drawing Sheets

TORSIONAL DAMPER WITH GUIDED FRICTION BLOCKS

BACKGROUND OF THE INVENTION

The present invention relates to a torsional damper of the type having damper elements resiliently coupled by a spring arrangement and a friction generating device. The torsional damper of this kind is advantageously used in transmitting torque between an internal combustion engine and a torque converter.

U.S. Pat. No. 4,904,225 issued to Worner et al., on Feb. 27, 1990 discloses damper elements coupled by a spring arrangement. The spring arrangement has an intermediate support connected resiliently to one damper element by long-stroke arcuate helicoidal springs and to the other damper element by short-stroke springs. Additionally, a friction generating device or slip coupling that exibits play is also arranged. The friction generating device is operative to generate frictional resistance that counteracts the movement of the damper elements.

A torsional damper has been proposed in copending U.S. patent application Ser. No. 08/301,568, filed Sep. 7, 1994, entitled "TORSIONAL DAMPER WITH FRICTION GENERATING DEVICE." This copending United States Application, having been commonly assigned herewith, claims priority based on Japanese Patent Application No. 5-222358 filed in Japan on Sep. 7, 1993. This torsional damper includes driver and driven damper elements resiliently coupled by a spring arrangement, and a friction generating device. The friction generating device includes a plurality of friction blocks received in a plurality of windows, respectively, of the driven damper elements with play in the circumferential direction of the driven damper element, and means on the driver damper element for biasing the plurality of friction blocks against a radially extending wall of the driver damper element. In operation, the friction blocks tend to be thrown radially outwardly to engage radially outer edges of the corresponding windows due to centrifugal force while the torsional damper rotates at high speeds. Owing to this engagement of the friction blocks with the edges of the windows, the friction blocks, the driven damper element entrains the friction blocks during relative rotation between the damper elements with small degrees below a predetermined degree even if the rotation of the driven damper element is not far enough to consume the movement play, generating frictional resistance that counteracts the movement of the driven damper element relative to the driver damper element.

An object of the present invention is to improve a torsional damper of this kind just mentioned with a friction generating device such that, during relative rotation between the damper elements within small degrees below a predetermined degree, the friction generating device does not offer frictional resistance that counteracts the relative rotation.

SUMMARY OF THE INVENTION

According to one aspect of the present invention, there is provided a torsional damper comprising:

first and second damper elements resiliently coupled by a spring arrangement, one of said first and second damper elements having a radially extending wall; and a friction generating device including a plurality of friction blocks received in a plurality of windows, respectively, of the other of said first and second damper elements with play in the circumferential direction of said other damper element, and means on said one damper element for biasing said plurality of friction blocks against said radially extending wall, said friction generating device including means in fixed relationship with said one damper element for restricting radial mobility, with respect to an axis of rotation of the torsional damper, of said plurality of friction blocks.

According to a specific aspect of the present invention, there is provided a torsional damper comprising:

first and second damper elements resiliently coupled by a spring arrangement, one of said first and second damper elements having a radially extending wall; and a friction generating device including a plurality of friction blocks received in a plurality of windows, respectively, of the other of said first and second damper elements with play in the circumferential direction of said other damper element, and means on said one damper element for biasing said plurality of friction blocks against said radially extending wall, said friction generating device including means for restricting radial mobility, with respect to an axis of rotation of the torsional damper, of said plurality of friction blocks to avoid interference engagement between said plurality of friction blocks and said other damper element during rotation of said other damper element relative to said one damper element with the play of one of said plurality of friction blocks in the corresponding one of said plurality of windows.

According to a further specific aspect of the present invention, there is provided a torsional damper comprising:

first and second damper elements resiliently coupled by a spring arrangement, one of said first and second damper elements having a radially extending wall;

a slip clutch operative between said first and second damper elements; and a friction generating device including a plurality of friction blocks received in a plurality of windows, respectively, of the other of said first and second damper elements with play in the circumferential direction of said other damper element, and means on said one damper element for biasing said plurality of friction blocks against said radially extending wall, said friction generating device including means for restricting radial mobility, with respect to an axis of rotation of the torsional damper, of said plurality of friction blocks to avoid interference engagement between said plurality of friction blocks and said other damper element during rotation of said other damper element relative to said one damper element with the play of one of said plurality of friction blocks in the corresponding one of said plurality of windows.

DETAILED DESCRIPTION OF THE INVENTION

Figure 1:
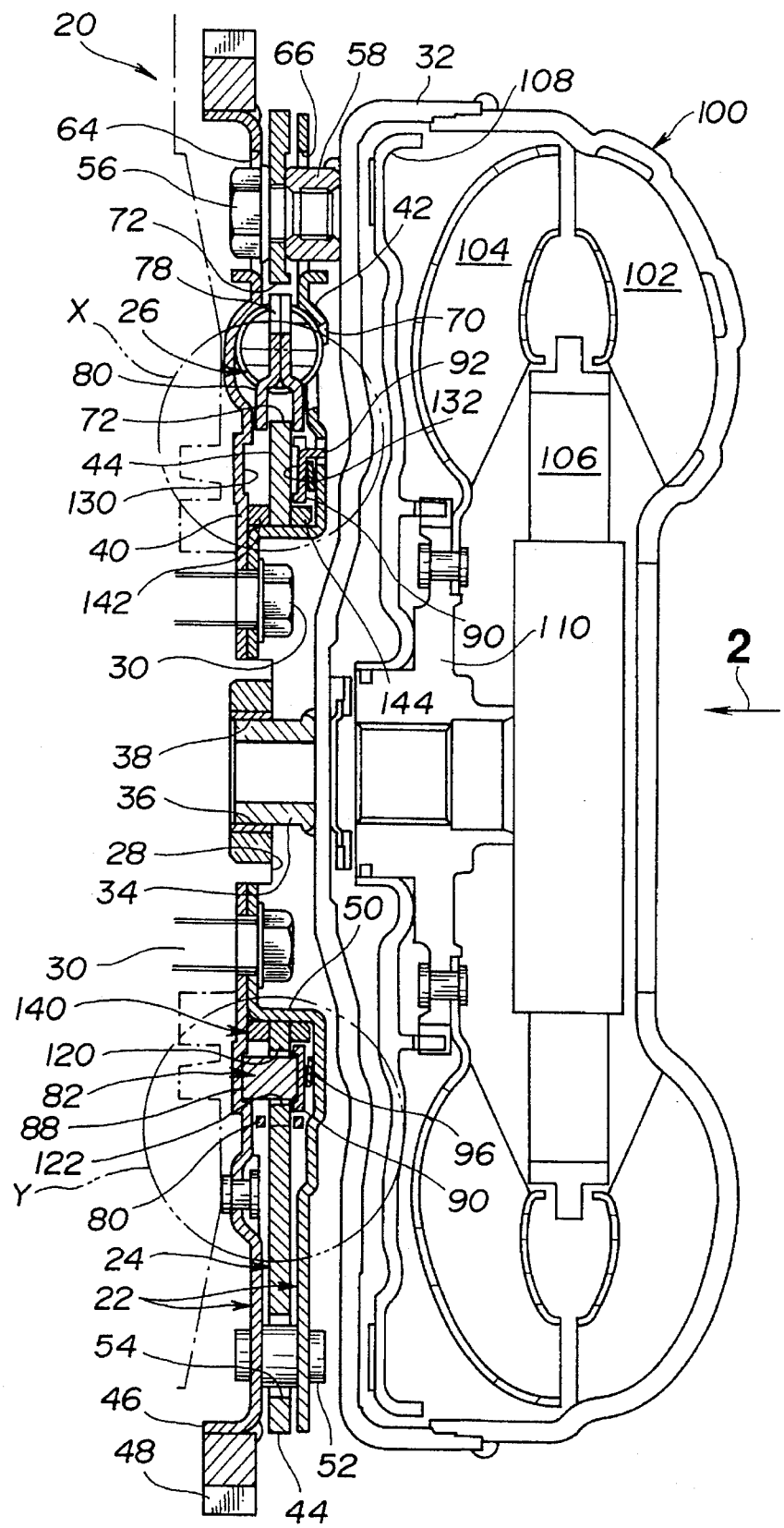
FIG. 1 is an axial section taken through the line 1—1 in FIG. 2, showing a preferred embodiment of a torsional damper according to the present invention.

Referring to FIG. 1, there is shown a torsional damper 20 that comprises two coaxial damper elements, namely a driver damper element 22 and a driven damper element 24, which elements are resiliently coupled together by a spring arrangement 26. The driver damper element 22 is affixed to a crankshaft 28 of an internal combustion engine by a set of axially parallel bolts 30. The driven damper element 24 can transmit torque to an input element (converter cover) 32 of a torque converter 100, which can in turn transmit torque to an input element (turbine shaft) of an automatic transmission. The converter cover 32 is drivingly connected to a pump impeller 102 of the torque converter 100 in a known manner, and has at its center a circular protuberance 34 received in a central opening 36 of the crankshaft 28 by means of a bushing 38. In addition to the pump impeller 102, the torque converter 100 comprises a turbine runner 104 and a stator 106 situated between the pump and turbine runners 102 and 104. The torque converter 100 is of the lock-up type including a lock-up piston 108 splined to a turbine hub 110 of the turbine runner 104.

The driver damper element 22 includes two annular plates, namely, a first or driver plate 40 and a second or side plate 42, while the driven damper element 24 includes an annular disc 44. The driver and side plates 40, 42 have their radially innermost portions secured to an annular axial end of the crankshaft 28 around the central opening 36. The driver plate 40 carries at its rim 46 a ring gear 48 adapted to mate with an output gear of a starter motor, not shown. The side plate 42 has an axially extending collar portion 50 adjacent its radially innermost portion. The driver and side plates 40, 42 are fixedly secured to each other by a set of distancing elements in the form of rivets 52. The rivets 52 ensure that the plates 40, 42 are held at a predetermined axial distance from each other. Received by the space between the driver and side plates 40, 42 is the annular disc 44 having its inner periphery facing and opposed to axially extending surface of the collar portion 50. The annular disc 44 is formed with a set of circumferentially spaced arcuate slots 54 receiving the rivets 52, respectively. The annular disc 44 is affixed to the converter cover 32 by a set of bolts 56 threadedly engaged with tapped rings 58 fixedly secured to the converter cover 32. The bolts 56 and arcuate slots 54 are alternately arranged. Coaxial relation between the damper elements 22, 24 is maintained by the bushing 38 rotatably supporting the converter cover 32. No bearing is thereby used between the damper elements 22, 24.

Figure 2:
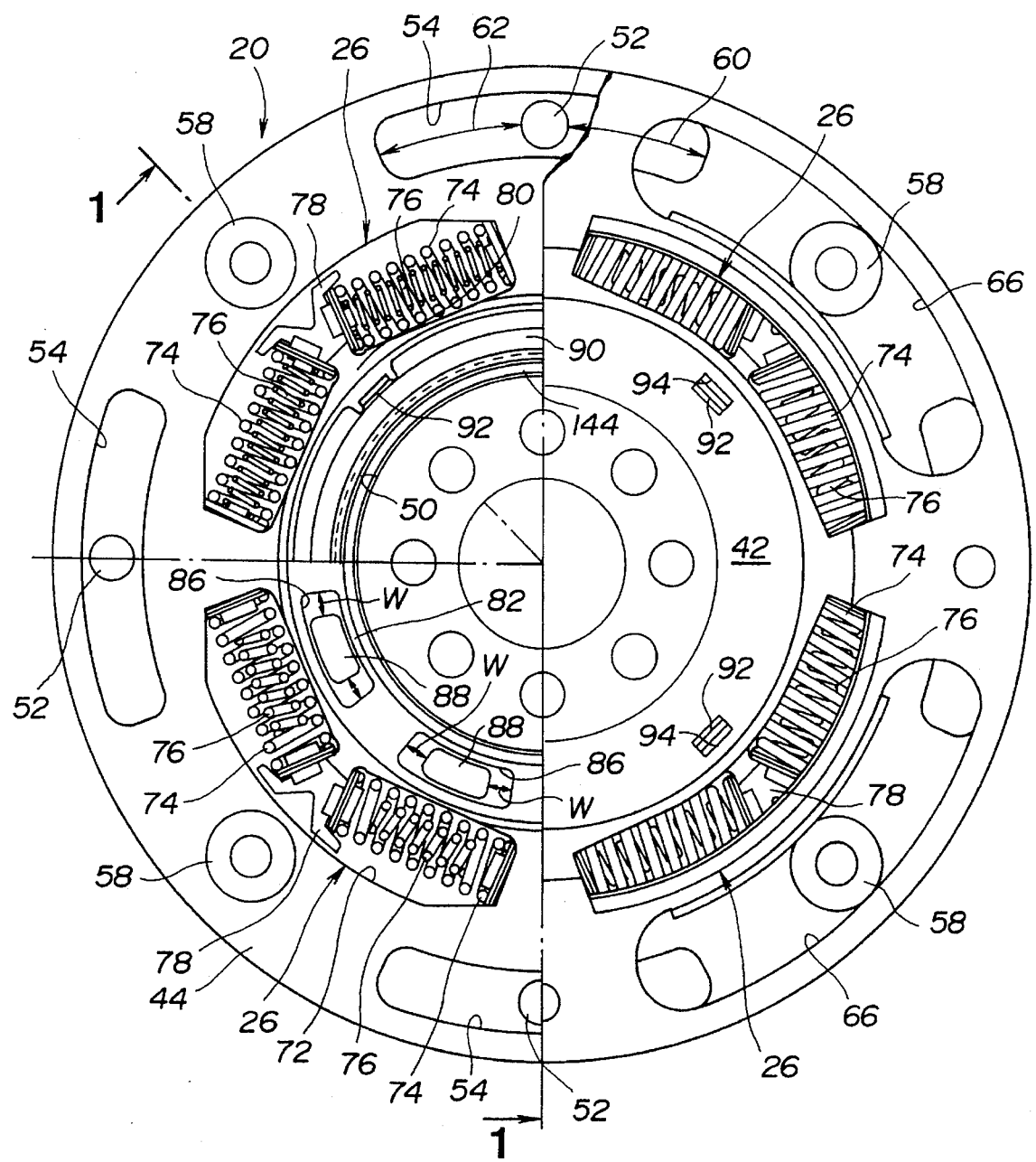
FIG. 2 is a fragmentary elevational view of the torsional damper as seen in the direction of arrow 2 in FIG. 1 with a converter cover and a part of a driven damper element omitted.

The damper elements 22, 24 are rotatable relative to each other within an angle corresponding to the gap 60+62 (see FIG. 2). The driver and side plates 40, 42 are formed with openings 64, 66, respectively, to avoid interference between the plates 40, 42 and the bolts and rings 56, 58 during the relative rotation between the damper elements 22, 24.

The plates 40, 42 are formed with windows, only one being shown at 70 in FIG. 1, which window register with windows 72 in the disc 44 to receive energy storing elements in the form of coil springs 74, 76. Extending into the windows 72 in the disc 44 are radially projecting arms 78 of a floating type spring retainer ring 80. As best seen in FIG. 2, each of the windows 72 receives a set of coil springs 74 separated by the corresponding arm 78. Also received in each of the windows 72 are a set of coil springs 76 disposed in the corresponding coil springs 74 and separated by the corresponding arm 78. These coil springs 74 and 76 are received in the windows of the plates 40, 42 too, and oppose angular displacements of the plates 40, 42 relative to the disc 44 and vice versa. The windows of the plates 40, 42, windows 72 in the disc 44, coil springs 74 and 76, and spring retainer ring 80 thereby constitute the spring arrangement 26 that resiliently couples the damper elements 22, 24.

Figure 3:
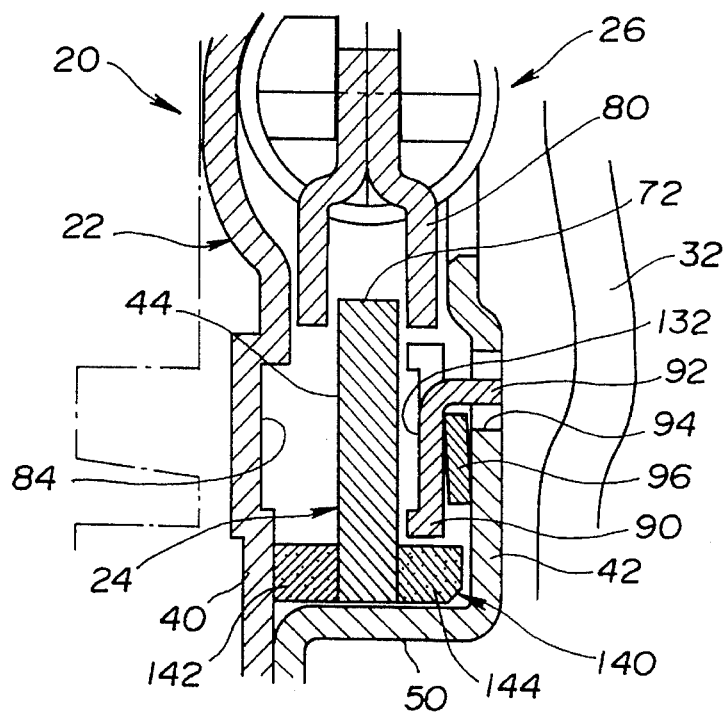
FIG. 3 is an enlarged view of the detail within the phantom-line circle "X" in FIG. 1.
Figure 4:
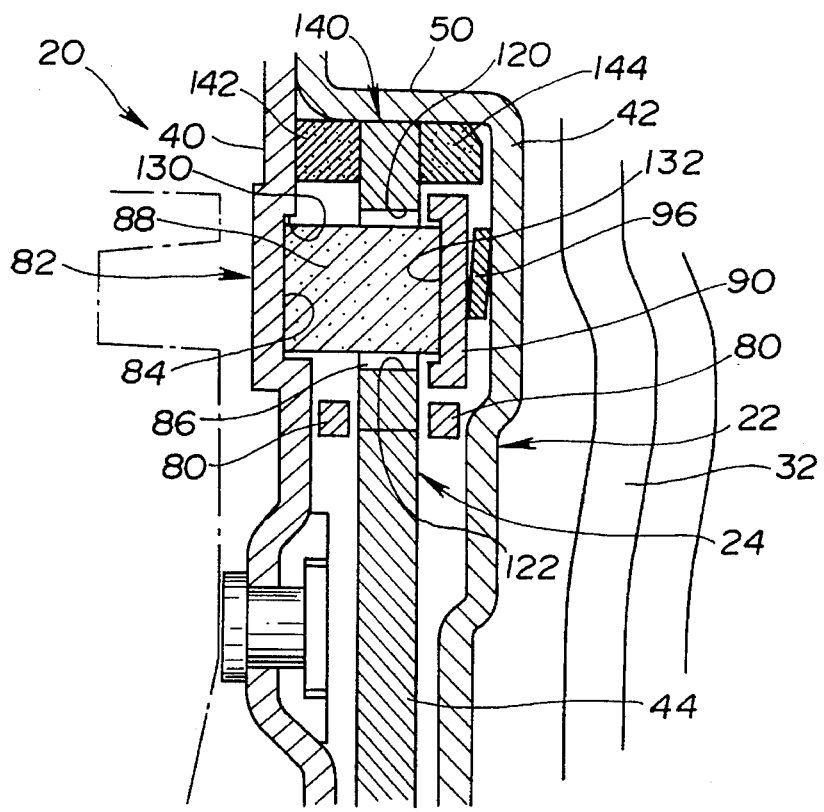
FIG. 4 is an enlarged view of the detail within the phantom-line circle "Y" in FIG. 1

As best seen in FIGS. 3 and 4, the torsional damper 20 further comprises a friction generating device 82. The friction generating device 82 surrounds the collar portion 50 of the driver damper element 22 and is disposed between a wall or surface 84 of the driver plate 40 and an inner face of the side plate 42. The annular disc 44 has on its internal circumference portion, which surrounds the collar portion 50 and is disposed between the radially extending wall 84 and the inner face of the side plate 42, windows 86 that receive friction blocks 88. The windows 86 are equi-distant in circumferential direction of the disc 44. The friction blocks 88 within the windows 86 abut the wall 84 of the driver plate 40. The friction blocks 88 cooperate by their end faces remote from the wall 84 with a friction ring 90. The friction ring 90 is arranged for limited axial movement but it is maintained firmly against rotation relative to the driver damper element 22 by means of lugs 92 at the periphery of the friction ring 90. The lugs 92 engage into slots 94 in the side plate 42. An annular plate spring 96 is clamped axially between the side plate 42 of the driver damper element 22 and the friction ring 90. The plate spring 96 biases the friction ring 90 against the friction blocks 88, and the friction blocks 88 against the wall 84 of the driver plate 40 of the driver damper element 22.

Figure 5:
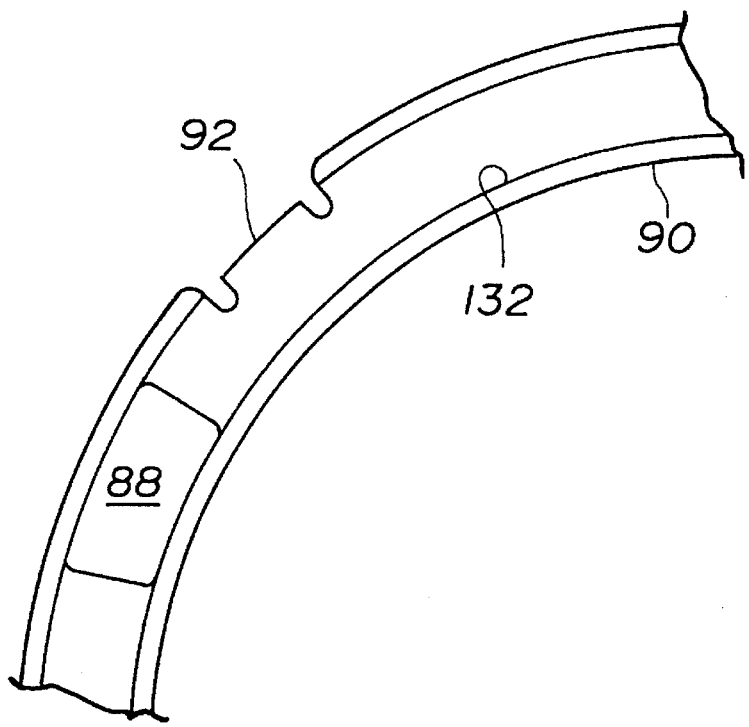
FIG. 5 is a fragmentary diagram illustrating a guide groove in which a friction block is disposed.
Figure 6:
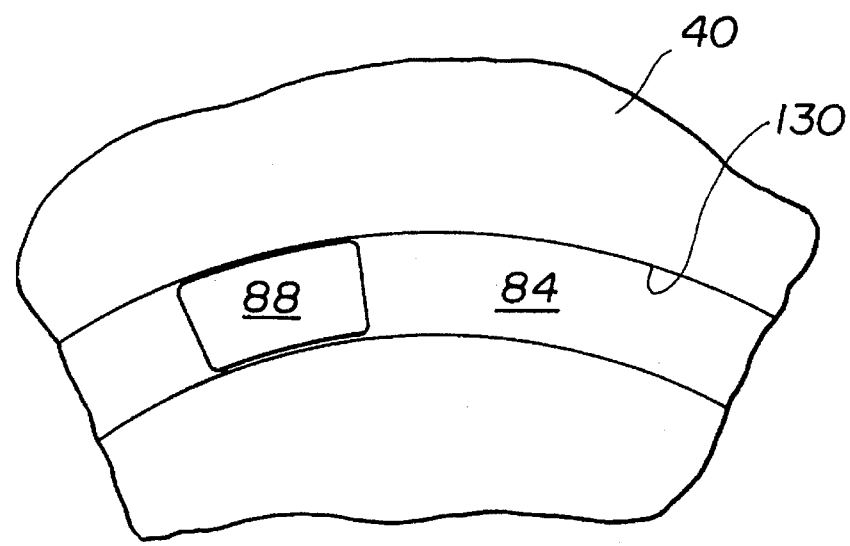
FIG. 6 is a fragmentary diagram illustrating another guide groove axially opposed to the guide groove of FIG. 5.

In order to avoid interference engagement of the friction blocks 88 with radially inner and outer edges 120 and 122 of the corresponding windows 86, the friction generating device 82 includes a pair of axially opposed guide grooves 130 and 132 in fixed relationship with the driver damper element 22. The guide grooves 130 and 132 restrict radial mobility, with respect to an axis of rotation of the torsional damper 20, of the friction blocks 88. The guide grooves 130 and 132 are formed in the driver plate 40, and the friction ring 90 respectively. As best seen in FIGS. 5 and 6, the pair of guide grooves 130 and 132 allow smooth movement of the guide blocks 88 in the circumferential direction of the disc 44. It is understood from FIGS. 4 and 6 that the wall 84 defines, in cooperating with opposing sides walls, the guide groove 130.

The torsional damper 20 also comprises a slip clutch 140 operative between the driver and driven damper elements 22 and 24. The slip clutch 140, which exibits no play, is disposed between the collar portion 50 and the friction generating device 82. The slip clutch 140 includes two friction rings 144 and 142 around collar portion 50. The around friction ring 142 is disposed between the driver plate 40 and the disc 44, while the other friction ring 144 is disposed between the disc 44 and the side plate 42.

As soon as the disc 44 of the driven damper element 24 is rotated relative to the driver damper element 22 far enough to consume the movement play of each of the friction blocks 88 in the corresponding window 86, the disc 44 of the driven damper element 24 entrains all of the friction blocks 88 in its further movement. During this further movement of the driven damper element 24 relative to the driver damper element 22, the frictional resistance counteracts the movement of the disc 44 relative to the driver plate 40 and the friction ring 90 in addition to the resistance offered by the spring arrangement 26. This mode of operation occurs upon engine start-up.

If the rotation of the disc 44 relative to the driver damper element 22 is not far enough to consume the movement play of the friction blocks 88 in the corresponding window 86, the guide grooves 130 and 132 hold each of the friction blocks out of engagement with the radially inner and outer edges 120 and 122 of the corresponding window 86. During this relative rotation, the slip clutch 140 offers frictional resistance in addition to the resistance offered by the spring arrangement 26. The friction rings 142 and 144 are engaged between the driver plate 40, the disc 44 and the side plate 42 to offer a relatively low friction resistance as compared to the frictional resistance offered by the friction generating device 82. This mode of operation occurs upon engagement of the lock-up piston 108.

From the preceding description, it is now understood that noises and/or vibrations induced upon engagement of the lock-up piston 108 are effectively suppressed due to the low frictional resistance offered by the slip clutch 140.

What is claimed is:

1. A torsional damper comprising:

first and second damper elements resiliently coupled by a spring arrangement, said first damper element having a wall;

a plurality of windows in said second damper element, each of said windows having radially inner and outer edges;

a plurality of friction blocks received in said plurality of windows, respectively, with play in the circumferential direction of said second damper element;

means on said first damper element for biasing said friction blocks against said wall; and means in fixed relationship with said first damper element and engaging opposite ends of the friction block for holding each of said friction blocks out of engagement with said radially outer and inner edges of the corresponding one of said windows.

2. A torsional damper as claimed in claim 1, wherein said biasing means includes a friction ring having a plurality of axially projecting lugs in engagement with a portion of said first damper element and an annular plate spring clamped between said friction ring and said portion of said first damper element to bias said friction ring against said friction blocks.

3. A torsional damper as claimed in claim 2, wherein said holding means includes a pair of axially opposed guide grooves, one being formed in said first damper element and including said radially extending wall at the bottom thereof, the other of said grooves being formed in said friction ring.

4. A torsional damper comprising:

first and second damper elements resiliently coupled by a spring arrangement, said first damper element having a wall;

a plurality of windows in said second damper element, each of said windows having radially outer and inner edges; and a plurality of friction blocks received in said plurality of windows, respectively, with play in the circumferential direction of said second damper element;

means on said first damper element for biasing said friction blocks against said wall;

means engaging opposite ends of the friction blocks for holding said friction blocks out of engagement with said radially outer and inner edges of the corresponding one of said plurality of windows to avoid interference engagement between said friction blocks and said second damper element during rotation of said second damper element relative to said first damper element with the play of one of said friction blocks in the corresponding one of said windows.

5. A torsional damper as claimed in claim 4, wherein said biasing means includes a friction ring having a plurality of axially projecting lugs in engagement with a portion of said first damper element and an annular plate spring clamped between said friction ring and said portion of said first damper element to bias said friction ring against said plurality of friction blocks.

6. A torsional damper as claimed in claim 5, wherein said holding means includes a pair of axially opposed guide grooves, one being formed in said first damper element, the other being formed in said friction ring.

7. A torsional damper adapted for use with an internal combustion engine having a crankshaft rotatable about an axis and having a central opening receiving a bushing, the crankshaft defining an annular axial end around the central opening, with a torque converter having an input element with a protuberance rotatably received by the bushing, the input element extending radially outwardly with respect to the axis, the torsional damper comprising:

a driver annular plate and a side annular plate having radially innermost portions thereof secured to the annular axial end of the crankshaft, the side plate having an axially extending collar portion adjacent the radially innermost portion thereof;

circumferentially spaced distancing elements disposed between the driver and the side plates adjacent radially outermost portions of the driver and the side plates and fixedly securing the driver and the side plates to each other with a predetermined distance held therebetween;

an annular disc disposed between the driver and the side plates and having an inner periphery facing and opposed to the axially extending collar portion of the side plate;

the annular disc having circumferentially spaced slots receiving the circumferentially spaced distancing elements, respectively;

circumferentially spaced fasteners affixing the annular disc to the input element adjacent an outer periphery of the annular disc;

the driver and the side plates having openings receiving the circumferentially spaced fasteners, respectively, to avoid interference between the driver and the side plates with the fasteners;

the side plates and the annular disc having windows registered with each other;

a spring retainer ring having a plurality of radially projecting arms extending into the annular disc windows, respectively;

a plurality of pairs of coil springs, each pair being received in each of the annular disc windows and separated by one of the radially projecting arms and received by the adjacent windows of the side plate;

a friction ring maintained firmly against rotation relative to the side plate for limited axial movement, with respect to the axis, toward the driver plate;

a plurality of friction block receiving windows in the annular disc, each friction block receiving windows having radially outer and inner edges;

a plurality of friction blocks interposed between the driver plate and the friction ring and received in the plurality of friction block receiving windows, respectively, each with a play in circumferential direction of the annular disc within the corresponding one of the friction block receiving windows;

a plate spring acting between the friction ring and the side plate to bias the friction ring against the friction blocks to keep the plurality of friction blocks in frictional contact with the driver plate and with the friction ring; and guide grooves in the driver plate and the friction ring, respectively, receiving one and opposite end portions of each of the friction blocks to hold each of the friction blocks out of engagement with the radially outer and inner edges of the corresponding one of the friction block receiving windows.

8. A torsional damper as claimed in claim 7, further comprising:

a slip clutch around the collar portion and the slip clutch including two friction rings, one being disposed between the driver plate and the annular disc, the other being disposed between the annular disc and the side plate.

* * * * *